(12) United States Patent
Nagino et al.

(10) Patent No.: US 9,358,518 B2
(45) Date of Patent: *Jun. 7, 2016

(54) SUPPORT CARRYING AN IMMOBILIZED SELECTIVE BINDING SUBSTANCE

(75) Inventors: Kunihisa Nagino, Kamakura (JP);
Fumio Nakamura, Juelich (DE);
Hitoshi Nobumasa, Kamakura (JP)

(73) Assignee: Toray Industries, Inc. (JP)

( * ) Notice: Subject to any disclaimer, the term of this patent is extended or adjusted under 35 U.S.C. 154(b) by 424 days.

This patent is subject to a terminal disclaimer.

(21) Appl. No.: 12/845,417

(22) Filed: Jul. 28, 2010

(65) Prior Publication Data

US 2011/0015097 A1 Jan. 20, 2011

Related U.S. Application Data

(62) Division of application No. 10/557,070, filed as application No. PCT/JP2004/007060 on May 18, 2004, now Pat. No. 7,795,006.

(30) Foreign Application Priority Data

May 19, 2003 (JP) ................................. 2003-140016
Dec. 16, 2003 (JP) ................................. 2003-417661

(51) Int. Cl.
*C40B 40/06* (2006.01)
*C40B 40/14* (2006.01)
*B01J 19/00* (2006.01)

(52) U.S. Cl.
CPC ...... *B01J 19/0046* (2013.01); *B01J 2219/0061* (2013.01); *B01J 2219/0063* (2013.01);
(Continued)

(58) Field of Classification Search
CPC ............ B01J 2219/00497; B01J 2219/00509; B01J 2219/00605; B01J 2219/0061; B01J 2219/00612; B01J 2219/00617; B01J 2219/00621; B01J 2219/00626; B01J 2219/0063; B01J 2219/00635; B01J 2219/00637

See application file for complete search history.

(56) References Cited

U.S. PATENT DOCUMENTS 6,664,044 B1    12/2003   Sato
6,720,157 B2 *   4/2004   Indermuhle et al. ........... 435/7.1
(Continued)

FOREIGN PATENT DOCUMENTS

EP    0 616 218    9/1994
EP    0 895 082 A2   2/1999
(Continued)

OTHER PUBLICATIONS

Yamato, M., "Novel Patterned Cell Coculture Utilizing Thermally Responsive Grafted Polymer Surfaces", *Journal of Biomedical Materials Research*, 2001, vol. 55, pp. 137-140.
(Continued)

*Primary Examiner* — Shafiqul Haq
(74) *Attorney, Agent, or Firm* — DLA Piper LLP (US)

(57) ABSTRACT

A support carrying an immobilized selective binding substance, that the support surface has a polymer containing the structural unit represented by the following General Formula (1) in an amount of 10% or more with respect all monomer units, and a selective binding substance is immobilized on the support surface by binding to the carboxyl group formed thereon via a covalent bond:

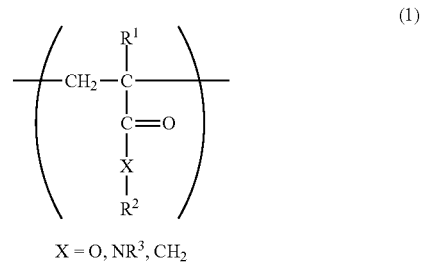

(1)

$X = O, NR^3, CH_2$ (in General Formula (1), $R^1$, $R^2$, and $R^3$ each represent an alkyl or aryl group or a hydrogen atom.)

12 Claims, 5 Drawing Sheets

(52) U.S. Cl.
CPC ............... *B01J2219/00497* (2013.01); *B01J 2219/00509* (2013.01); *B01J 2219/00576* (2013.01); *B01J 2219/00605* (2013.01); *B01J 2219/00612* (2013.01); *B01J 2219/00617* (2013.01); *B01J 2219/00621* (2013.01); *B01J 2219/00626* (2013.01); *B01J 2219/00635* (2013.01); *B01J 2219/00637* (2013.01); *B01J 2219/00653* (2013.01); *B01J 2219/00659* (2013.01); *B01J 2219/00677* (2013.01); *B01J 2219/00707* (2013.01); *B01J 2219/00722* (2013.01); *B01J 2219/00725* (2013.01); *B01J 2219/00729* (2013.01); *B01J 2219/00731* (2013.01); *Y10S 530/812* (2013.01); *Y10S 530/815* (2013.01); *Y10S 530/816* (2013.01)

(56) References Cited

U.S. PATENT DOCUMENTS

| | | | |
|---|---|---|---|
| 6,916,614 | B1 | 7/2005 | Takenaka et al. |
| 7,795,006 | B2 | 9/2010 | Nagino et al. |
| 2002/0187074 | A1 | 12/2002 | O'Connor et al. |
| 2003/0044799 | A1 | 3/2003 | Matson |
| 2003/0124029 | A1* | 7/2003 | Webb et al. ............... 422/102 |
| 2003/0143592 | A1 | 7/2003 | Kawamura et al. |
| 2003/0207460 | A1 | 11/2003 | Kitagawa |
| 2005/0063877 | A1 | 3/2005 | Takahashi et al. |

FOREIGN PATENT DOCUMENTS

| | | |
|---|---|---|
| EP | 1 387 390 | 2/2004 |
| JP | 10-503841 A | 4/1998 |
| JP | 2000-63154 | 2/2000 |
| JP | 2000-63154 A | 2/2000 |
| JP | 2000-304749 A | 11/2000 |
| JP | 2001-108683 | 4/2001 |
| JP | 2001-108683 A | 4/2001 |
| JP | 2001-178460 | 7/2001 |
| JP | 2001-178460 A | 7/2001 |
| JP | 2001-337089 | 12/2001 |
| JP | 2001-337089 A | 12/2001 |
| JP | 2002-71693 | 3/2002 |
| JP | 2002-71693 A | 3/2002 |
| JP | 2003-130874 | 5/2003 |
| JP | 2003-130874 A | 5/2003 |
| JP | 2003-130879 | 5/2003 |
| JP | 2003-130879 A | 5/2003 |
| JP | 10-503841 | 4/2008 |
| WO | 95/35505 A1 | 12/1995 |
| WO | 99/47127 | 9/1999 |
| WO | 01/67104 A2 | 9/2001 |
| WO | 01/98781 A1 | 12/2001 |
| WO | 03/016868 A2 | 2/2003 |

OTHER PUBLICATIONS

Holmberg et al., "Methods of Immunobilization of Proteins to Polymethylmethacrylate", *Preparative Biochemistry*, 1985, vol. 15, pp. 309-319.

* cited by examiner

ID 10/557,070, filed Nov. 15, 2005 and accorded a filing

SEQUENCE LISTING

<160> NUMBER OF SEQ ID NOS: 8

<210> SEQ ID NO 1
<211> LENGTH: 70
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 1
atcgtaaaga acattttgag gcatttcagt cagttgctca atgtacctat aaccagaccg    60
ttcatctgga                                                           70

<210> SEQ ID NO 2
<211> LENGTH: 60
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 2
acattttgag gcatttcagt cagttgctca atgtacctat aaccagaccg ttcatctgga    60

<210> SEQ ID NO 3
<211> LENGTH: 40
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 3
cagttgctca atgtacctat aaccagaccg ttcatctgga                          40

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 4
aaccagaccg ttcatctgga                                                20

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 5
gggcgaagaa gttgtccata                                                20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 6

```
gcagagcgag gtatgtaggc                                               20

<210> SEQ ID NO 7
<211> LENGTH: 2246
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 7
atggcaacag tcaatcagct ggttcgaaag ccgcgagctc gtaaagtggc caaatctaac      60
gttccggctc tcgaggcatg cccgtagaag cgtggcatat gcacacgcgt atacactact     120
actccgaaga aaccgaattc agcgctgcgc aagctttgcc gcgtacgcct gaccaacggt     180
ttcgaggtca cctcatatat aggtggtgaa ggacacaacc tgcaggaaca ctctgttatc     240
ctgatcagag gcggccgcgt taaagatctg cccgggatcc ggtaccacac cgtccgcggc     300
gctctagact gctccggagt aaaggaccgt cgacaggatc gatcgaaata cggtgtaaaa     360
cgtccgaagg cctaatagaa gctagcttgg cactgggcca agctgaattt ctgccattca     420
tccgcttatt atcacttatt caggcgtagc accaggcgtt taagggcacc aataactgcc     480
ttaaaaaaat tacgccccgc cctgccactc atcgcagtac tgttgtaatt cattaagcat     540
tctgccgaca tggaagccat cacagacggc atgatgaacc tgaatcgcca gcggcatcag     600
caccttgtcg ccttgcgtat aatatttgcc catagtgaaa acggggcga  agaagttgtc     660
catattagcc acgtttaaat caaaactggt gaaactcacc cagggattgg ctgagacgaa     720
aaacatattc tcaataaacc ctttagggaa ataggccagg ttttcaccgt aacacgccac     780
atcttgcgaa tatatgtgta gaaactgccg gaaatcgtcg tggtattcac tccagagcga     840
tgaaaacgtt tcagtttgct catggaaaac ggtgtaacaa gggtgaacac tatcccatat     900
caccagctca ccgtctttca ttgccatacg aaattccgta tgagcattca tcaggcgggc     960
aagaatgtga ataaaggccg ataaaacttg tgcttatttt tctttacgg tctttaaaaa    1020
ggccgtaata tccagatgaa cggtctggtt ataggtacat tgagcaactg actgaaatgc    1080
ctcaaaatgt tctttacgat gccattggga tatatcaacg gtggtatatc cagtgatttt    1140
tttctccatt ttagcttcct tagctcctga aaatctcgat aactcaaaaa atacgcccgg    1200
tagtgatctt atttcattat ggtgaaagtt ggaacctctt acgtgccgat caacgtctca    1260
ttttcgccaa aagttggccc agggcttccc ggtatcaaca gggacaccag gatttattta    1320
ttctgcgaag tgatcttccg ttcgacggag ttccactgag cgtcagaccc cgtagaaaag    1380
atcaaaggat cttcttgaga tccttttttt ctgcgcgtaa tctgctgctt gcaaacaaaa    1440
aaaccaccgc taccagcggt ggtttgtttg ccggatcaag agctaccaac tctttttccg    1500
aaggtaactg gcttcagcag agcgcagata ccaaatactg tccttctagt gtagccgtag    1560
ttaggccacc acttcaagaa ctctgtagca ccgcctacat acctcgctct gctaatcctg    1620
ttaccagtgg ctgctgccag tggcgataag tcgtgtctta ccgggttgga ctcaagacga    1680
tagttaccgg ataaggcgca gcggtcgggc tgaacggggg gttcgtgcac acagcccagc    1740
ttggagcgaa cgacctacac cgaactgaga tacctacagc gtgagcattg agaaagcgcc    1800
acgcttcccg aagggagaaa ggcggacagg tatccggtaa gcggcagggt cggaacagga    1860
gagcgcacga gggagcttcc aggggggaaac gcctggtatc tttatagtcc tgtcgggttt    1920
cgccacctct gacttgagcg tcgatttttg tgatgctcgt caggggggcg gagcctatgg    1980
```

-continued

```
aaaaacgcca gcaacgcggc cttttttacgg ttcctggcct tttgctggcc ttttgctcac    2040
atgttctttc ctgcgttatc ccctgattct gtggataacc gtattaccgc ctttgagtga    2100
gctgataccg ctcgccgcag ccgaacgacc gagcgcagcg agtcagtgag cgaggaagcg    2160
gaagaagcat tctgaaatga gctgttgaca attaatcatc gaactagtta actagtacgc    2220
aagttcacgt aaaaagggta tcgacc                                          2246
```

<210> SEQ ID NO 8
<211> LENGTH: 968
<212> TYPE: DNA
<213> ORGANISM: Artificial Sequence
<220> FEATURE:
<223> OTHER INFORMATION: Description of Artificial Sequence: Synthetic
      nucleotide plasmid pKF3

<400> SEQUENCE: 8

```
gggcgaagaa gttgtccata ttagccacgt ttaaatcaaa actggtgaaa ctcacccagg      60
gattggctga gacgaaaaac atattctcaa taaacccttt agggaaatag gccaggtttt     120
caccgtaaca cgccacatct tgcgaatata tgtgtagaaa ctgccggaaa tcgtcgtggt     180
attcactcca gagcgatgaa aacgtttcag tttgctcatg gaaaacggtg taacaagggt     240
gaacactatc ccatatcacc agctcaccgt ctttcattgc catacgaaat tccgtatgag     300
cattcatcag gcgggcaaga atgtgaataa aggccggata aaacttgtgc ttatttttct     360
ttacggtctt taaaaaggcc gtaatatcca gatgaacggt ctggttatag gtacattgag     420
caactgactg aaatgcctca aaatgttctt tacgatgcca ttgggatata tcaacggtgg     480
tatatccagt gattttttc tccatttag cttccttagc tcctgaaaat ctcgataact       540
caaaaaatac gcccggtagt gatcttattt cattatggtg aaagttggaa cctcttacgt     600
gccgatcaac gtctcatttt cgccaaaagt tggcccaggg cttcccggta tcaacaggga     660
caccaggatt tatttattct gcgaagtgat cttccgttcg acggagttcc actgagcgtc     720 agacccgta gaaaagatca aaggatcttc ttgagatcct ttttttctgc gcgtaatctg      780
ctgcttgcaa acaaaaaaac caccgctacc agcggtggtt tgtttgccgg atcaagagct     840
accaactctt tttccgaagg taactggctt cagcagagcg cagataccaa atactgtcct     900
tctagtgtag ccgtagttag gccaccactt caagaactct gtagcaccgc ctacatacct     960
cgctctgc                                                              968
```

SUPPORT CARRYING AN IMMOBILIZED SELECTIVE BINDING SUBSTANCE

RELATED APPLICATION

This application is a divisional of U.S. patent application Ser. No. 10/557,070, filed Nov. 15, 2005 and accorded a filing date under §371(c) of Dec. 9, 2005, which is a §371 of International Application No. PCT/JP2004/07060, with an international filing date of May 18, 2004 (WO 2004/102194 A1, published Nov. 25, 2004), which is based on Japanese Patent Application No. 2003-140016, filed May 19, 2003 and Japanese Patent Application No. 2003-417661, filed Dec. 16, 2003, the contents of all of which are herein incorporated by reference.

TECHNICAL FIELD

This disclosure relates to a support carrying an immobilized substance that binds to an analyte substance selectively ("selective binding substance" in the present specification).

BACKGROUND

Along with advance in research on genetic information analysis of various living organisms, more information about a number of genes including human genes and their base sequences as well as the proteins coded by the gene sequences and the sugar chains produced there proteins secondarily is becoming available rapidly. The functions of the macromolecules such as gene, protein, and sugar chain with distinct sequence can be studied by various methods. For example as for nucleic acids, mainly, the relationship between various genes and their biological functions can be studied for example by using the complementarity of a nucleic acid and another nucleic acid such as Northern hybridization or Southern hybridization. As for proteins, it is possible to study the function and expression of proteins such by methods of using protein/protein interaction such as Western hybridization.

In recent years, a new assay method or methodology called DNA microarray method (DNA chip method) was developed and attracting attention recently as a method of analyzing expression of multiple genes at the same time. All these methods are the same in principle as conventional methods, because they are methods of detecting and quantifying nucleic acids based on hybridization reaction between nucleic acids, and applicable to detection and quantification of proteins and sugar chains based on the interaction between protein/protein, sugar chain/sugar chain, or sugar chain/protein. These methods are characteristic in that a piece of flat glass substrate called microarray or chip carrying multiple DNA fragments, proteins, or sugar chains that are immobilized densely is used. Typical examples of the use of the microarray method include a method of hybridizing a gene expressed in analyte cell with a sample labeled, for example, a fluorochrome on a flat substrate, allowing mutually complementary nucleic acids (DNA or RNA) to bind to each other, and detecting the binding sites rapidly in a high-resolution analyzer; and a method of detecting the response such as the change in electric current due to an electrochemical reaction. In this manner, it is possible to estimate the amounts of the genes present in sample.

For example, Japanese Patent Application National Publication (Laid-Open) No. 10-503841 (Claims) discloses a method of coating poly-L-lysine, aminosilane, or the like on a flat substrate such as slide glass and immobilizing nucleic acids by using a spotting device called spotter, as the method for immobilizing a nucleic acid on substrate.

Alternatively, for example, Japanese Patent Application Laid-Open (JP-A) No. 2001-108683 discloses a method of using oligo-DNAs (oligo-DNA is a DNA having a base number of 10 to 100) as nucleic acid probes used on DNA chip (nucleic acids immobilized on substrate) instead of the conventional method of using cDNAs and the fragments thereof having base lengths of hundreds of thousands, for reduction of error during detection and convenience of synthesis in synthesizer. In the method, the oligo-DNAs are bound to the glass plate covalently.

In addition to glass, there are some proposals on resin substrates, as the material for used as the substrate for DNA chip. For example, JP-A No. 2001-337089 (Paragraph 17) describes a polymethyl methacrylate polymer. However, JP-A No. 2001-337089 discloses no specific method of immobilizing DNA. In addition, JP-A No. 2003-130874 (Paragraph 12) also has a similar description but discloses no specific method of immobilizing DNA. JP-A No. 2002-71693 (Paragraph 7) discloses a method of modifying a nitrile group-containing fiber such as acryl fiber into a carboxyl group-containing fiber by alkali treatment and immobilizing DNAs or the like by bonding the carboxyl groups. However, the alkali fiber, which contains polyacrylonitrile as the main component, has a problem that it has a high autofluorescence as it is and is not suitable as a substrate. Further, JP-A No. 2002-71693 (Paragraph 7) discloses a method of modifying polymethacrylate by copolymerization with acrylic acid or methacrylic acid into a carboxyl group-containing fiber and allowing the carboxyl groups to bind to DNAs, but the method was disadvantageous in that the substrate (support) had a smaller amount of surface carboxyl groups leading to decrease in the amount of immobilized DNA and consequently insufficient intensity of the signal after hybridization.

SUMMARY

Problems to overcome of this disclosure are resolution of the following: First, immobilization of an oligo-DNA on a flat glass substrate leads to the following problems: 1) A problem that sample DNA is often adsorbed nonspecifically in the area other than the spots where probe DNA is immobilized during hybridization because the glass is hydrophilic and the nonspecifically adsorbed sample is also detected during fluorescent detection with a device called scanner, resulting in increase in noise. 2) A problem that the hybridization efficiency with sample DNA is low, the signal intensity is low, and consequently the S/N ratio is insufficient, probably because the spatial degree of freedom of the covalently bound oligo-DNA is restricted due to the rigidity of glass.

One of our objectives is to provide a support carrying an immobilized DNA firmly bound to a resin substrate in a state higher in hybridization efficiency. Another object thereof is to provide a support carrying an immobilized selective binding substance that is resistant to the deterioration in the S/N ratio and is higher in detection sensitivity.

Namely, we provide a support carrying an immobilized selective binding substance, which comprises the surface of the support is comprising a low-autofluorescence resin, the surface of the polymer is treated with an alkali or acid, forming carboxyl groups, and additionally a selective binding substance is immobilized thereon.

We also provide a support carrying an immobilized selective binding substance which comprises the support that carries the selective binding substance immobilized on the surface thereof, the support surface has a polymer containing the structural unit represented by the following General Formula (1), the surface of the polymer is treated with an alkali or acid and a selective binding substance is immobilized thereon:

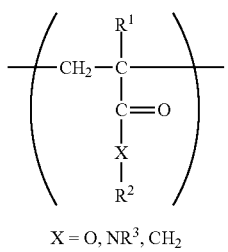

(1)

$X = O, NR^3, CH_2$ (in General Formula (1), $R^1$, $R^2$, and $R^3$ each represent an alkyl or aryl group or a hydrogen atom.)

We provide a support carrying an immobilized selective binding substance smaller in adsorption of nonspecific sample, higher in hybridization efficiency, and consequently superior in S/N ratio.

DETAILED DESCRIPTION

Figure 1:
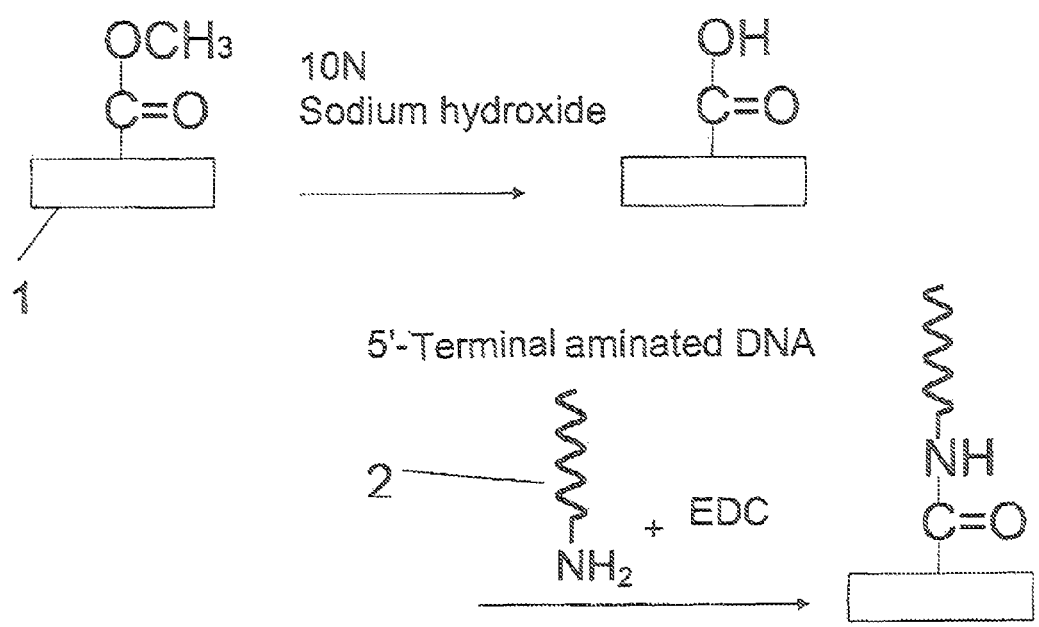
FIG. 1 is a chart illustrating the reaction scheme for immobilizing a selective binding substance on a PMMA surface.

Hereinafter, the support carrying an immobilizing a selective binding substance will be described.

The support carrying an immobilized selective binding substance comprises the surface of the support is comprising a low-autofluorescence resin and the surface of the resin is treated with an alkali or acid, forming carboxyl groups. The low-autofluorescence resin is a resin having a fluorescence intensity of 1,000 or less, as determined by measuring a clean flat plate thereof having a thickness of 1 mm by using Gene-Pix 4000B manufactured by Axon Instruments under the conditions of a excitation wavelength of 532 nm, a set photomultiplier gain of 700, and a laser power of 33%. Resins unsatisfying the requirement above are undesirable because of the deterioration in S/N ratio during detection. Examples of such resins include the polymers represented by the following General Formula (1).

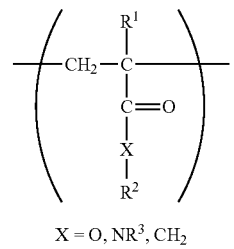

(1)

$X = O, NR^3, CH_2$

The support carrying an immobilized selective binding substance has a support surface of a solid having a polymer containing the structural unit represented by the following General Formula (1) for immobilization of a selective binding substance.

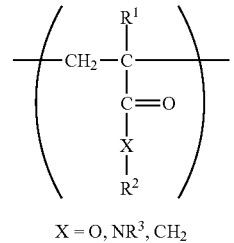

(1)

$X = O, NR^3, CH_2$ in General Formula (1), $R^1$, $R^2$ and $R^3$ each represent an alkyl or aryl group or a hydrogen atom.)

The polymer may be a homopolymer or a copolymer. At least one type of monomer is used as the raw material for the polymer, and the monomer is present as a double bond for polymerization or a functional group for polycondensation, ketone or carboxylic acid or the derivative thereof. The polymer more preferably has the structure represented by General Formula (1).

When the polymer is a copolymer, the polymer preferably contains the structural unit represented by General Formula (1) in an amount of 10% or more with respect to the total monomer units. When the content of the structural unit represented by General Formula (1) is 10% or more, it is possible to form more carboxyl groups on the surface and immobilize more probe nucleic acids in the steps described below, leading to improvement in the S/N ratio.

The polymer is a compound having a number-averaged polymerization degree of 50 or more. The number-averaged polymerization degree of the polymer is preferable in the range of 100 to 10,000, and particularly preferably 200 or more and 5,000 or less. The number-averaged polymerization degree can be determined easily by measuring the molecular weight of a polymer according to a common method by GPC (gel permeation chromatography).

In General Formula (1), $R^1$ and $R^2$ each represent an alkyl or aryl group or a hydrogen atom, and may be the same as or different from each other. The alkyl group may be a straight-chain or branch group, and preferably has 1 to 20 carbon atoms. The aryl group preferably has 6 to 18 carbon atoms, more preferably 6 to 12 carbon atoms. The functional group X is selected arbitrarily from O, $NR^3$, and $CH_2$. $R^3$ is a functional group defined similarly to $R^1$ and $R^2$.

Favorable examples of the polymers containing the functional groups described above include polyalkyl methacrylates (PAMA) such as polymethyl methacrylate (PMMA), polyethyl methacrylate (PEMA) and polypropyl methacrylate, and the like. Among them, polymethyl methacrylate is preferable, from the points of processability during injection molding or embossing and relatively higher glass transition temperature. Alternatively, polyvinyl acetate, polycyclohexyl methacrylate or polyphenyl methacrylate, or the like may also be used. Yet alternatively, a copolymer in combination of the polymer components above or a copolymer in combination of the polymer components and one or more other polymer components may also be used. The other polymer is, for example, polystyrene.

When a copolymer is used, the ratio of the carbonyl group-containing monomer, for example, alkyl methacrylate, is preferably in the range of 10 mole % or more, because it is possible to increase the amount of the carboxylic acid groups formed on the surface, raise the capacity for immobilizing probe nucleic acids, and consequently raise the S/N ratio. The ratio of the monomer in the polymer structural units is more preferably 50 mole % or more.

Further, it is necessary to conduct a pretreatment of the support with an alkali or acid for immobilizing a selective binding substance containing the polymer having at least one structural unit represented by General Formula (1).

In this manner, it becomes possible to form carboxyl groups on the support surface. For forming carboxyl groups on the support surface, the alkali or acid treatment may be used alone or in combination with another method such as sonication while warm or exposure to oxygen plasma, argon plasma or radiation ray. Among these methods, preferable from the points of reduction in the damage of the support and easier processability is the method of forming carboxyl groups on surface by immersing the support in a heated alkali or acid. More specifically, the support may be immersed in an aqueous sodium hydroxide or sulfuric acid solution (preferable concentration: 1 to 20N) preferably at a temperature of 30° C. to 80° C. for 1 to 100 hours.

Formation of the carboxyl groups on the support surface by the above-mentioned method can be confirmed by XPS (X-ray photoelectron spectroscopy). Specifically, the carboxyl groups are labeled with fluorine by using a fluorine-containing labeling reagent (e.g., trifluoroethanol). It is possible then to estimate the amount of the functional groups, from the intensity of C1s and F1s peak areas of the labeled subsequent sample, taking the reaction rate into consideration. For further improvement in accuracy, formation of the carboxyl groups on the support surface may be confirmed by determining the fluorine distribution on the surface of a trifluoroethanol-labeled sample by TOF-SIMS (time-of-flight secondary ion mass spectrometry).

Thus the carboxyl groups are formed on the support surface, it would be possible to immobilize a selective binding substance on the support, by avidin-biotin interaction by modifying the support with biotin or avidin and additionally modifying the selective binding substance with avidin or biotin, or alternatively, to immobilize a selective binding substance, by allowing the support to react with a linker such as ethylenediamine and additionally the linker to react with the selective binding substance. However, these methods, which demand two-step reactions, often result in decrease in the amount of the selective binding substance immobilized on the support, because of their reaction yields. Therefore, it is preferable to immobilize a selective binding substance by allowing the carboxyl groups on support to react directly with the functional group of the selective binding substance. In other words, it is preferable to immobilize a selective binding substance by covalent bonds between the amino or hydroxyl group of the selective binding substance and the carboxyl group on the support surface. Generally, various condensation agents such as dicyclohexylcarbodiimide and N-ethyl-5-phenylisoxazolium-3'-sulfonate were used for facilitating the bond-forming reaction. Among them, 1-ethyl-3-(3-dimethylaminopropyl) carbodiimide (EDC), which is less toxic and easily removed from the reaction system, is one of the condensation agents most effective for the condensation reaction of a selective binding substance with the carboxyl groups on the support surface. Another favorable condensation agent is 4-(4,6-dimethoxy-1,3,5-triazin-2-yl)-4-methyl-morpholinium chloride (DMT-MM). The condensation agent, for example EDC, may be used as it is mixed into a solution of the selective binding substance, or alternatively, a support carrying carboxyl groups previously formed on the surface is immersed in a solution of EDC and thus the surface carboxyl groups are activated.

When the carboxyl groups on support surface are reacted with the amino group of a selective binding substance by using such a condensation agent, the selective binding substance is immobilized on the support surface by amide bond, while when the carboxyl groups on the support surface are reacted with the hydroxyl group of a selective binding substance, the selective binding substance is immobilized on the support surface by ester bond. The temperature of the reaction between a sample containing the selective binding substance and a support is preferably 5° C. to 95° C. and more preferably 15° C. to 65° C. The processing period is generally 5 minutes to 24 hours, and preferably 1 hour or more. FIG. 1 is a chart showing the scheme for immobilizing a selective binding substance. (In FIG. 1, 1 represents a PMMA substrate; and 2 represents a selective binding substance (DNA).)

By immobilizing a selective binding substance on a polymer surface by the method described above, it is possible to immobilize the selective binding substance densely and rigidly via covalent bonds suppressing nonspecific adsorption of sample (typically, DNA) because of the negatively charged carboxyl groups present on the surface except in the spotted regions, and to obtain a support higher in hybridization efficiency with sample, presumably because the immobilized selective binding substance has a spatial degree of freedom greater than that immobilized on a glass surface. The higher spatial degree of freedom described above provides an advantage that it is possible to obtain an extremely improved hybridization efficiency with sample in particular when the immobilized selective binding substance used is a so-called oligo-DNA having a length of 10 to 100 bases.

Figure 2:
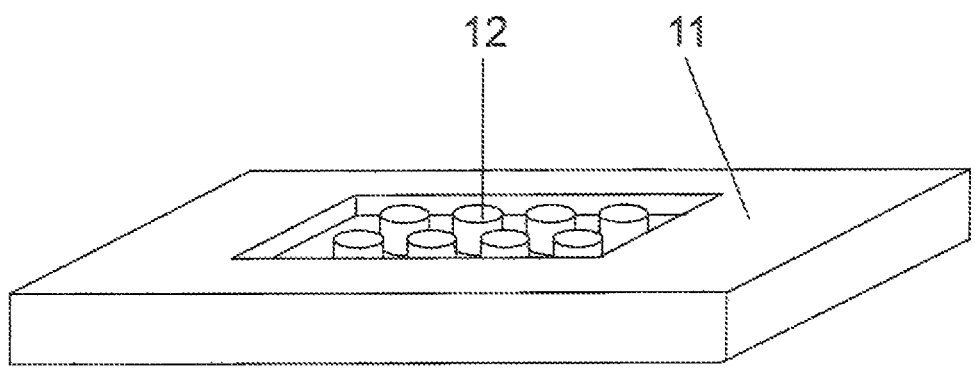
FIG. 2 is a schematic view illustrating a support.
Figure 3:
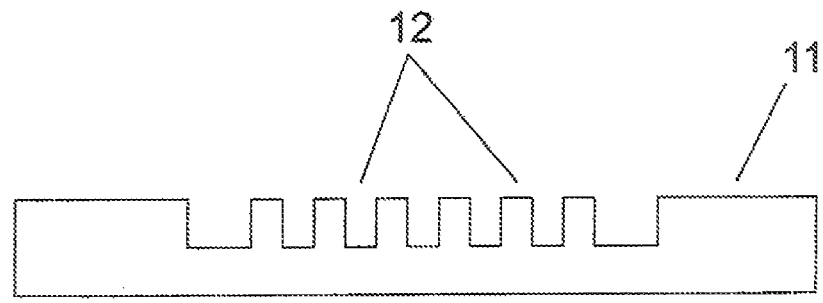
FIG. 3 is a schematic cross-sectional view of the support.

By using a polymer having the structural unit represented by General Formula (1) for the support, it is possible to produce a support having a fine shape more easily in a greater amount, for example, by injection molding or hot embossing than from glass, ceramic, or metal. The shape of the support on which the selective binding substance is immobilized will be described below. The support carrying an immobilized selective binding substance has a concavo-convex part preferably, and the selective binding substance is preferably immobilized on the face of the projections. Such a structure eliminates detection of nonspecifically adsorbed samples as will be described below during analysis, and provides a support carrying an immobilized selective binding substance that has smaller noise and consequently is favorable in the S/N ratio. As for the height of multiple projections in the concavo-convex part, the faces of projections are preferably almost the same in height. The height almost the same described above means a height that does not cause any significant difference in fluorescence intensity level when a fluorescent labeled analyte is allowed to react with a selective binding substance immobilized on the surfaces of projections slightly different in height and the bound analytes on respective surfaces are scanned with a scanner. Concretely, the height almost the same mean a difference in height of 100 μm or less. In addition, the support preferably has a flat area. A typical example is shown in FIGS. 2 and 3. 11 represents the flat area, and a selective binding substance (e.g., nucleic acid) is immobilized on the surface of the projections represented by 12 in the concavo-convex part. The top face of the projections in the concavo-convex part is preferably substantially flat. The term "substantially flat" means that the projection top face does not have an irregularity of 50 μm or more in height. Further, the height of the projections in the concavo-convex part is almost the same as that of the flat area. The phrase "the height of the flat area is almost the same as that of the irregularly surfaced area" means that there is no significant problem of the decline in signal level when the support is scanned with a scanner. Concretely, the height almost the same means the difference between the heights of the projection top face in the concavo-convex part and that of the flat area is less than 100 μm.

Generally on microarrays, a fluorescent-labeled sample and a selective binding substance immobilized on a support are allowed to react each other, and the resulting fluorescence is read out with a device called scanner. The scanner deflects an excitation laser beam with an object lens and focuses the laser beam. The focused beam is irradiated onto the microarray surface, and the focal point of the laser beam is directed to the microarray surface. The fluorescence generated on the microarray is then read out by scanning the object lens or the microarray per se under the same condition.

When a support carrying a selective binding substance immobilized on the projection top face is scanned by using a scanner, an effect of the fluorescence (noise) of a sample DNA nonspecifically attracted on the concavo area in the concavo-convex part being hard to detect is demonstrated. It is because the laser beam is focused on the projection top face and defocused in the concavo area. In other words, among the multiple projections on which the selective binding substance is immobilized, the difference in height between the faces of highest and lowest projections is preferably 50 μm or less. It is because fluctuation in the heights of the projection top faces greater than the difference above may prohibit accurate determination of the fluorescence intensity because of the focal depth of the scanner.

The difference in height between the faces of highest and lowest projections among the multiple projections on which the selective binding substance may be preferably 50 μm or less, more preferably 30 μm or less, and still more preferably, the height of the projections is the same. The same height in this patent application includes the errors due to the fluctuations that may occur during production or the like.

The multiple projection area on which the selective binding substance is immobilized means an area where a selective binding substance essential for data collection (e.g., nucleic acid) is immobilized and does not include an area where only a dummy selective binding substance is immobilized.

Figure 4:
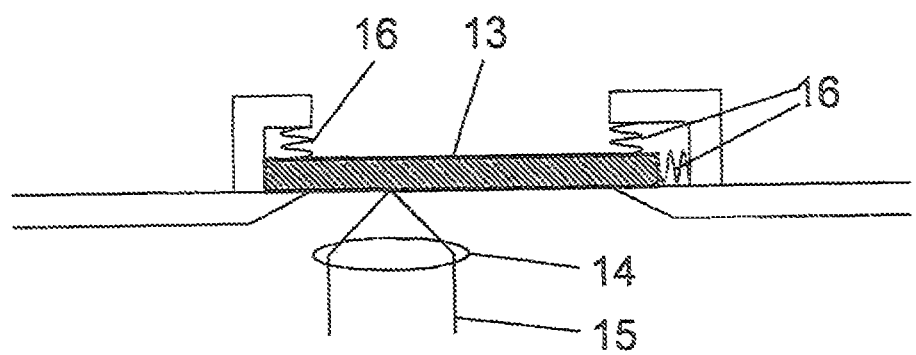
FIG. 4 is a chart illustrating a jig for holding a microarray.

Generally, the method of adjusting focal point of scanner is as follows: Namely, when focusing an excitation beam on the microarray surface, the scanner adjust the focal point of the laser beam by focusing the excitation beam at the corner of the microarray or by fixing the microarray to a jig as shown in FIG. 4. The scanner scans the entire microarray under the same condition. (In FIG. 4, 13 represents a microarray; 14, an object lens; 15, an excitation light; and 16, a spring for fixing a microarray to a jig). Thus, the support preferably has a concavo-convex part as well as a flat area. A typical example thereof is shown in FIGS. 2 and 3. 11 represents a flat area, and a selective binding substance (e.g., nucleic acid) is immobilized on the surface of the projections in the concavo-convex part represented by 12. Further, the difference in height between the face of the projections in the concavo-convex part and of that in the flat area is preferably 50 μm or less. In this manner, when a support carrying an immobilized selective binding substance is scanned, it becomes possible to adjust the focal point of the excitation beam once on the face of the flat area or to fix the flat area to the jig, making it easier to position the focal point of scanner. Because the excitation beam is thus focused in the flat area, the top face of the projections on which a selective binding substance is immobilized is preferably flat and the difference in height between the face of the projections and the face of the flat area is preferably 50 μm or less.

A difference in height between the face of the projections and the face of the flat area at 50 μm or more may cause the following problems. Namely, because the focal point of excitation beam is adjusted at the top face in the flat area, when the height of the projection top face differs, the focal point of excitation beam may become blurred on the projection top face, in the worst case resulting in completely no detection of the fluorescence generated by the reaction between the selective binding substance and the sample. A similar phenomenon may occur when there is no flat area that is as high as the face of the projections.

Alternatively, when the top face of projections is not flat, the focal size of the excitation beam on the projection top face may vary, consequently leading to fluctuation in the fluorescent intensity detected even on a single projection top face, which makes the subsequent analysis more difficult. In the case of present application, such problems are prevented, favorable signal (fluorescence) can be obtained.

The difference in height between the face of the projections and the face of the flat area may be preferably 50 μm or less, more preferably 30 μm or less, still more preferably the same as that in the flat area. The same height in this patent application includes the errors due to the fluctuations that may occur during production or the like.

A selective binding substance is not spotted on a planar support, but a selective binding substance is immobilized only on the face of the projections in the concavo-convex part. Thus, even when an analyte sample is adsorbed nonspecifically onto the area other than the projection top face, no fluorescence from the undesirable analyte sample adsorbed nonspecifically is detected, because the focal point of excitation beam is blurred in the area other than the projection top face, leading to reduction in noise and consequently improvement of its S/N ratio.

Use of an injection molding method is desirable from productivity for production of the support in such a shape. A mold would be needed for production of the support in the above-mentioned shape by the injection molding method, and use of a LIGA (Lithographie Galvanoformung Abformung) process is preferable for production of the mold, because it gives a mold from which the molded support is easily separated.

In addition, the areas of the respective top faces of projections are preferably almost the same. In this manner, it becomes possible to make uniform the areas on which different selective binding substances are immobilized, which is advantageous for the subsequent analysis. The phrase "the areas of the respective top faces of projections are preferably almost the same" means the value of the largest top face area divided by the smallest top face area of all the projections is 1.2 or less.

The area of the projection top face is not particularly limited, but is preferably 4 $mm^2$ or less and 10 $\mu m^2$ or more, from the points of reduction in the amount of the selective binding substance used and easier handling.

The height of the projections in the concavo-convex part is preferably 0.01 mm or more and 1 mm or less. A projection height of lower than the value above may result in detection of the nonspecifically adsorbed analyte sample in the area other than the spots and consequently in deterioration in S/N ratio. Alternatively, a projection height of 1 mm or more may cause problems such as the vulnerability to breakage due to fracture of the projections.

Figure 5:
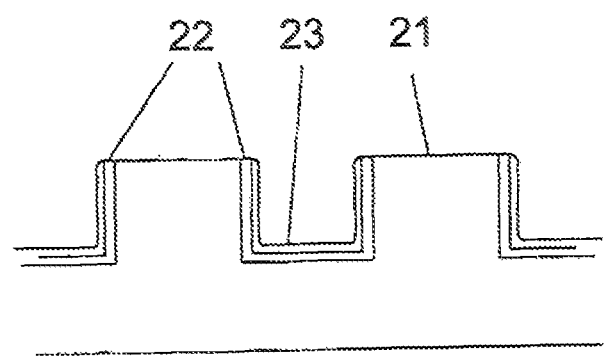
FIG. 5 is a cross-sectional view of the concavo-convex part.

It is also preferable that a conductive material is formed at least on the side face of the projections. In this manner, it becomes possible to accelerate hybridization, for example, of nucleic acids, by forming a counter electrode and applying a voltage between the counter electrode and the conductive material. Preferable area of the projections where the conductive material is coated is the entire area of concave parts or the entire side face of the projections. FIG. 5 shows an example (in FIG. 5, 21 represents the face of a projection; 22, a conductivity film; and 23 an insulation film). If electric current flows, the voltage applied is preferably in the range of 0.01 V or more and 2 V or less, and particularly preferably in the range of 0.1 V or more and 1.5 V or less. Application of a voltage larger than that above may result in electrolysis of water and thus generation of adverse effects on the selective binding substance on surface. The material for the conductive material is not particularly limited, and example thereof include carbon, manganese, aluminum, silicon, titanium, vanadium, chromium, manganese, iron, cobalt, nickel, copper, tin, zirconium, niobium, molybdenum, palladium, silver, hafnium, tantalum, tungsten, platinum, gold, stainless steel, or the mixture thereof, and conductive polymers. Among them, platinum, gold, and titanium are used particularly preferably. Methods of producing the film of these conductive materials include vapor deposition, sputtering, CVD, metal plating, and the like.

When a conductive material is coated on the projection area as described above, an insulating material layer is preferably formed additionally on the area of the projections other than the top face. Presence of the insulating material layer allows attraction of the analyte onto the projection top face when an electric current is applied. Examples of the insulating materials include metal oxides (e.g., Al—O, $SiO_2$, $TiO_2$, VO, SnO, Cr—O, Zn—O, $GeO_2$, $Ta_2O_5$, $ZrO_2$, Nb—O, $Y_2O_3$, etc.), nitrides (Al—N, $Si_3N_4$, TiN, Ta—N, Ge—N, Zr—N, NbN, etc.), sulfides (e.g., ZnS, PbS, SnS; and CuS), and insulating polymers.

The support carrying an immobilized selective binding substance thus obtained may be treated additionally after immobilization of the selective binding substance. It is possible, for example, to modify the immobilized selective binding substance by treatment such as heat treatment, alkali treatment, or surfactant treatment.

Generally, a fluorescent labeled sample and a selective binding substance immobilized on a support are allowed to react each other in hybridization reaction on the support carrying an immobilized selective binding substance, and the fluorescence form the resulting support is read out with a device called scanner. The scanner deflects an excitation laser beam with an object lens and focuses the laser beam. However, when there is autofluorescence of the surface of the support, the fluorescence may cause noise and lead to deterioration in detection accuracy. For prevention thereof, blackening the surface by adding a black substance that does not emit light by laser irradiation to the surface to the polymer having the structural unit represented by General Formula (1) is preferable, as it reduces the autofluorescence from the support per se. By using such a support, it is possible to provide a support carrying an immobilized selective binding substance that has lower noise and consequently a favorable S/N ratio during detection, because the autofluorescence from the support can be reduced.

The blackened support means a support of which the blackened area has a uniformly low spectroscopic reflectance not in a particular spectral pattern (e.g., without any particular peaks) and a uniformly low spectroscopic transmissibility not in a particular spectral pattern in the visible light range (wavelength: 400 to 800 nm).

As for the spectroscopic reflectance and transmissibility, the spectroscopic reflectance is preferably in the range of 7% or less in the visible light range (wavelength: 400 to 800 nm) and the spectroscopic transmissibility is preferably 2% or less in the same wavelength range. The spectroscopic reflectance is a spectroscopic reflectance including the regular reflected light from the support, as determined in an optical illuminator-detector system compatible with the condition C of JIS Z8722.

The support may be blackened by adding a black substance to the support, and favorable examples of the black substances include carbon black, graphite, titanium black, aniline black, oxides of metals such as Ru, Mn, Ni, Cr, Fe, Co and Cu, carbides of metals such as Si, Ti, Ta, Zr and Cr, and the like.

These black substances may be contained alone or in combination of two or more; among the black substances, carbon black, graphite, titanium black are preferably contained; and carbon black is used particularly preferably, because it is easily dispersed uniformly in polymer.

Figure 6:
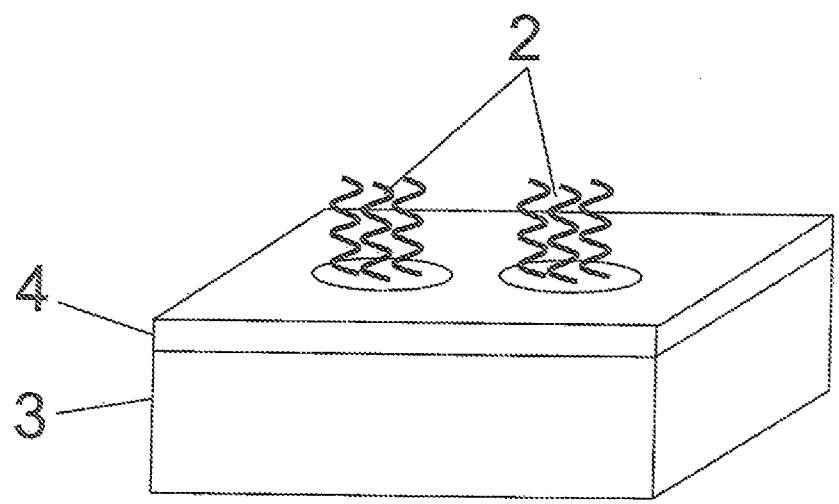
FIG. 6 is a schematic diagram illustrating a support having a support layer and a layer carrying an immobilized selective binding substance.

As for the shape of support, it is preferable to form a layer carrying an immobilized selective binding substance of a polymer having at least one structural unit represented by General Formula (1) on a support layer of a material resistant to heat deformation such as glass or metal, for prevention of the alteration in the shape of support due to heat or external force. Alternatively, a resin resistant to relatively high temperature such as polycarbonate, polyimide, or polyamide may be used as the support layer. FIG. 6 is a chart illustrating such a structure. (2 represents a selective binding substance (DNA), 3 represents a support layer (glass), and 4 represents a layer carrying an immobilized selective binding substance (PMMA)). Glass or a metal such as iron, chromium, nickel, titanium, or stainless steel is preferable as the support layer. In addition, the surface of the support layer is preferably finished in a plasma treatment with argon, oxygen, or nitrogen gas or treated with a silane-coupling agent, for improvement in adhesion between the support layer and the layer carrying an immobilized selective binding substance. Examples of the silane-coupling agents include 3-aminopropyltriethoxysilane, 3-aminopropyltrimethoxysilane, 3-aminopropyldiethoxymethylsilane, 3-(2-aminoethylaminopropyl)trimethoxysilane, 3-(2-aminoethylaminopropyl)dimethoxymethylsilane, 3-mercaptopropyltrimethoxysilane, dimethoxy-3-mercaptopropylmethylsilane, and the like. A layer carrying an immobilized selective binding substance is formed on the support layer by any one of known means, for example, by spin coating with or dipping in a solution of a polymer dissolved in an organic solvent. More conveniently, the layer carrying an immobilized selective binding substance may be adhered to the support with an adhesive.

The "selective binding substance" means a substance that can selectively bind to an analyte substance directly or indirectly, and typical Examples thereof include nucleic acids, proteins, saccharides, and other antigenic compounds. The nucleic acid may be DNA, RNA, or PNA. Single strand nucleic acids having a particular base sequence selectively hybridizes with and binds to a single strand nucleic acid having the base sequence complementary to the base sequence or the part thereof, and thus are included in the "selective binding substances." Examples of the proteins include antibodies, antigen-binding antibody fragments such as Fab fragments and F (ab') 2 fragments, and various antigens. Antibodies and their antigen-binding fragments that selectively bind to respective complementary antigens and antigens that selectively bind to respective complementary antibodies are also included in "selective binding substances." Polysaccharides are preferably as the saccharides, and examples thereof include various antigens. Alternatively, an antigenic substance other than protein or saccharide may be immobilized. The selective binding substance for use may be a commercially available product or a substance prepared from living cell or the like. Particularly preferable as the "selective binding substances" is a nucleic acid. Among nucleic acids, so-called oligonucleic acids, nucleic acids having a length of 10 to 100 bases, are preferable, because it is possible easily to prepare in a synthesizer, attach the amino group to the terminal of the nucleic acid, and thus immobilize it onto the support surface. Further, the length of the oligonucleic acid is preferably 20 to 100 bases, from the viewpoint that the hybridization efficiency is lower with an oligonucleic acid having less than 20 bases, and particularly preferably in the range of 40 to 100 bases, for ensuring the stability of hybridization efficiency.

Examples of the analyte substances to be processed in the measurement method by using the support include, but are not limited to, nucleic acids to be evaluated, such as genes of pathogenic bacteria and viruses and causative genes of genetic diseases, or the partial region thereof; various antigenic biological components; antibodies to pathogenic bacteria and viruses; and the like. Examples of the samples containing the analyte substances above include, but are not limited to, body fluids such as blood, serum, blood plasma, urine, feces, spinal fluid, saliva, and various tissue fluids and various foods and drinks or diluents thereof, and the like. The analyte nucleic acid may be prepared by labeling a nucleic acid extracted from blood or cell according to a common method or by amplification by a nucleic acid amplification method such as PCR by using the nucleic acid as a template. In the latter case, it is possible to increase the measurement sensitivity drastically. When an amplified nucleic acid product is used as the analyte substance, it is possible to label the amplified nucleic acid by performing amplification in the presence of a nucleotide-3-phosphate labeled with a fluorescent material or the like. When the analyte substance is an antigen or antibody, the analyte substance, antigen or antibody, may be directly labeled by a common method, or alternatively, the analyte substance, antigen or antibody, may first bound to a selective binding substance; after washing of the support, the antigen or antibody is allowed react with a labeled antibody or antigen that reacts in the antigen-antibody reaction; and then, the labels bound to the support is analyzed.

The step for the interaction between the immobilized substance and an analyte substance may be the same as that traditionally practiced. The reaction temperature and period may be selected arbitrarily, for example, according to the chain length of the nucleic acid to be hybridized and the kinds of the antigen and/or the antibody involved in the immune reaction, but the reaction is generally carried out at approximately 50° C. to 70° C. approximately for 1 minute to more than ten hours in the case of nucleic acid hybridization, and generally, at room temperature to approximately 40° C. for approximately 1 minute to several hours in the case of immune reaction.

EXAMPLES

We describe in more detail with reference to the following Examples, but it should be understood that this disclosure is not restricted by the following Examples.

Referential Example 1

A transparent polymethyl methacrylate (PMMA) plate (Comoglass extruded plate, manufactured by Kuraray Co., Ltd.; thickness: 1 mm, average molecular weight: 150,000, i.e., number-averaged polymerization degree: 1,500) was washed thoroughly with ethanol and purified water and immersed in an aqueous 10N sodium hydroxide solution at 70° C. for 12 hours. Then, the plate was washed with purified water, an aqueous 0.1N HCl solution, and purified water in that order. By using the alkali-treated plate and a non-alkali-treated plate as samples, the carboxyl groups on the sample surface were labeled with a fluorine-containing labeling reagent (trifluoroethanol) in gas phase. Then, the samples were analyzed by XPS under the conditions of an X ray diameter of 1 mm and a photoelectron escape angle 90° by using monochromatic Al Kα1 and 2 rays (1486.6 eV), and the carboxyl groups thereon were determined from the C1s and F1s peak area intensities, taking into consideration the reaction rate. The results revealed that the carboxyl group content of the alkali untreated sample was 0.0013(ratio of carboxyl-group carbon with respect to total carbon), while that of the alkali-treated sample was 0.0015, showing an increase in the surface carboxyl group content.

In addition, TOF-SIMS (time-of-flight secondary ion mass spectrometry) analysis on the amount and distribution of fluorine on the surface of the two samples of which the surface carboxyl groups were labeled with trifluoroethanol gave the following results. When two samples were compared, sodium hydroxide-treated sample showed stronger peaks of $^{19}F^-$ and $^{69}CF^{3-}$ than untreated sample, indicating that the sodium hydroxide-treated sample contained more carboxyl groups than the untreated sample. Specifically, an ionic count of the peak having a mass number 19 corresponding to $F^-$ of the untreated sample was 8,000, while an ionic count of the sodium hydroxide-treated sample was 25,000. In addition, the ionic count of the peak having a mass number 69 corresponding to $CF^{3-}$ of the untreated sample was 1,200, but that of the sodium hydroxide-treated sample was 7,000. Further, two-dimensional TOF SIMS analysis on the fluorine distribution on the surface of the samples revealed that the sodium hydroxide-treated sample had a localized $^{19}F^-$ ion image (presence of circular areas of 30 to 40 μm and streaks of 30 to 40 μm in width lower in ionic strength). The results indicate that the alkali-treated sample has a distribution in which the surface carboxyl groups localized. On the other hand, the untreated sample did not show the distribution in which the $^{19}F^-$ ion image is particularly localized. Alternatively, both two samples showed no particularly localized distribution in the $^{31}CH_3O^-$ ion image presumably corresponding to a methoxy group.

Example 1

Preparation of DNA-immobilized Support

A transparent polymethyl methacrylate (PMMA) plate (Comoglass extruded plate, manufactured by Kuraray Co., Ltd.; thickness: 1 mm, average molecular weight: 150,000, i.e., number-averaged polymerization degree: 1,500) was immersed in an aqueous 10N sodium hydroxide solution at 65° C. for 12 hours. Then, the plate was washed thoroughly with purified water, an aqueous 0.1N HCl solution, and purified water in that order. In this manner, carboxyl groups are formed on the plate surface by hydrolysis of the side chains of PMMA. The intensity of the self-fluorescence of the plate (non-alkali-treated) was 650, as determined under the conditions of an excitation wavelength of 532 nm, a set photomultiplier gain of 700, and a laser power of 33% by using GenePix 4000B manufactured by Axon Instruments.

(Immobilization of Probe DNA)

DNA's having sequence No. 1 (70 bases, 5'-terminal aminated), sequence No. 2 (60 bases, 5'-terminal aminated), sequence No. 3 (40 bases, 5'-terminal aminated), and sequence No. 4 (20 bases, 5'-terminal aminated) were prepared. 5'-Terminals of the DNA's having sequence Nos. 1 to 4 were aminated.

These DNA's were dissolved in purified water to a concentration of 0.27 nmol/μl, to give respective stock solutions. For spotting on substrate, prepared was a solution of each probe diluted with PBS (a solution of 8 g of NaCl, 2.9 g of $Na_2HPO_4$-$12H_2O$, 0.2 g of KCl, and 0.2 g of $KH_2PO_4$ dissolved in purified water to a total volume of 1 L and added hydrochloric acid for pH adjustment, pH: 5.5) to a final concentration of 0.027 nmol/μl, containing additionally 1-ethyl-3-(3-dimethylaminopropyl) carbodiimide (EDC) at a final concentration of 50 mg/ml, for condensation of the carboxyl groups on the support surface with the terminal amino group of the probe DNA. Then, each of these mixture solutions was spotted on the substrate in an amount of approximately 200 nl. That is, the four kinds of probes were spotted respectively at one point on the PMMA substrate. Then, the substrate was placed in a tightly sealed plastic container, and incubated under the condition of 37° C. and a humidity of 100% for approximately 20 hours, and then washed with purified water. FIG. 1 shows the reaction scheme.

(Preparation of Sample DNA):

A DNA of sequence No. 8 (968 bases) having a base sequence hybridizable with the DNA-immobilized substrate was used as a sample DNA.

The preparative method is as follows: DNA's of sequence Nos. 5 and 6 were prepared. These DNA's were respectively dissolved in purified water to a concentration of 100 μM. Then, pKF3 plasmid DNA (Takara Bio Inc. Product Number: 3,100, sequence No. 7, 2,264 bases) was made available, and was amplified by using it as template and DNA's of sequences Nos. 5 and 6 as primers in a PCR reaction (Polymerase Chain Reaction).

The PCR condition is as follows: ExTaq (2 μl), 10×Ex-Buffer (40 μl), and dNTp Mix (32 μl) (these reagents were attached to the Product Number RR001A manufactured by Takara Bio Inc.), a solution of sequence No. 5 (2 μl), a solution of sequence No. 6 (2 μl), and a solution of template (sequence No. 7) (0.2 μl) were mixed and diluted with purified water to a total volume of 400 μl. The liquid mixture was divided into four micro tubes, and the PCR reaction was performed by using a thermal cycler. The product was purified by ethanol precipitation and dissolved in 40 μl of purified water. Electrophoretic analysis of part of the solution after PCR reaction confirmed that the base length of the amplified DNA was approximately 960 bases and the DNA of sequence No. 8 (968 bases) was amplified.

Then, a random primer having 9 bases (manufactured by Takara Bio Inc., Product Number 3802) was dissolved to a concentration of 6 mg/ml, and 2 μl of the solution was added to the above-mentioned purified DNA solution after PCR reaction. The solution was heated at 100° C. and quenched on ice. 5 μl of the buffer attached to Klenow Fragment (manufactured by Takara Bio Inc., Product Number 2140AK) and 2.5 μl of a dNTP mixture (containing dATP, dTTP, and dGTP each at a concentration of 2.5 mM and dCTP at a concentration of 400 μM) were added thereto. Further, 2 μl of Cy3-dCTP (manufactured by Amersham Pharmacia Biotech, Product Number PA53021) was added. After addition of 10U of Klenow Fragment to the solution, the mixture was incubated at 37° C. for 20 hours, to give a Cy3-labeled sample DNA. Use of the random primer during labeling resulted in fluctuation in the length of the sample DNA. The longest sample DNA is the DNA of sequence No. 8 (968 bases). Electrophoretic analysis of part of the sample DNA solution showed the most intensive band in the area approximately corresponding to 960 bases and bands slightly smeared in the area corresponding to shorter base lengths. The product was then purified by ethanol precipitation and dried.

The labeled sample DNA was dissolved in 400 μl of a solution containing 1% (w/v) BSA (bovine serum albumin), 5×SSC (5×SSC: 43.8 g of NaCl and 22.1 g of trisodium citrate hydrate dissolved in purified water to a total volume of 1 L; 43.8 g of NaCl and 22.1 g of trisodium citrate hydrate dissolved in purified water to a total volume of 5 L was designated as 1×SSC; and the 10×-concentrated solution, 10×SSC, 5×-diluted solution, 0.2×SSC.), 0.1% (w/v) SDS (sodium dodecylsulfate) and 0.01% (w/v) salmon sperm DNA (each concentration: final concentration), and used as a solution for hybridization.

(Hybridization)

The probe DNA thus obtained was applied on the immobilized substrate for hybridization of the sample DNA. Specifically, 10 μl of the solution for hybridization was applied dropwise onto the support carrying the immobilized probe nucleic acid prepared above and the support was covered with a cover glass. In addition, the cover glass was sealed with a paper bond, for preventing vaporization of the hybridization solution. The support was placed in a plastic container and incubated under the condition of 65° C. and a humidity of 100% for 10 hours. After incubation, the cover glass was removed and the support was washed and dried.

(Measurement)

After hybridization, the fluorescence from the substrate surface was observed under a fluorescence microscope (Olympus Optics) for evaluation of the presence of the hybridization. Fluorescent emission indicating hybridization was observed on the entire probe region. The difference in intensity between the fluorescences on the spot and the background expanded, as the base number increased from 40, to 60 and 70, i.e., improving the S/N ratio as the base number of probe is increased.

For more quantitative discussion, the support after treatment was then set on a scanner for DNA chip (GenePix 4000B, manufactured by Axon Instruments), and the fluorescence therefrom was determined under the conditions of a laser output of 33% and a photomultiplier gain of 500. The results are summarized in Table 1. In the Table, the fluorescence intensity is the average fluorescence intensity on the spot, and the noise is the average fluorescence intensity in the area surrounding the spot (area where no DNA was spotted).

Comparative Example 1

Tests were conducted while the PMMA substrate in Example 1 was replaced with a glass substrate.

A slide glass was immersed in an aqueous 10N NaOH solution for 1 hour and washed thoroughly with purified water. Then, APS (3-aminopropyltriethoxysilane; manufactured by Shin-Etsu Chemical Co., Ltd.) was dissolved in purified water at a ratio of 2% (w/v), and the above-mentioned slide glass was immersed therein for 1 hour, then removed from the solution, and dried at 110° C. for 10 minutes. In this way, amino groups are introduced on the glass surface.

Figure 7:
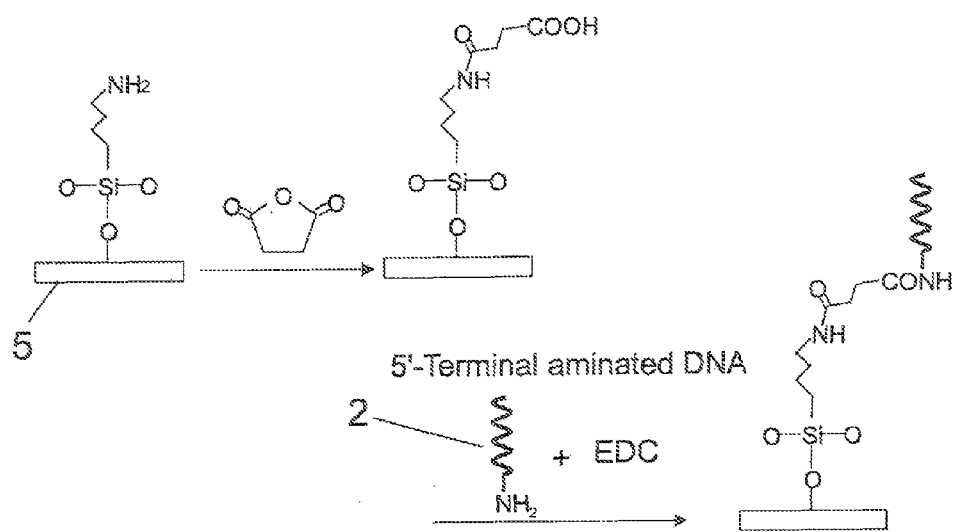
FIG. 7 is chart illustrating the reaction scheme for immobilization of a selective binding substance on a glass surface.

Then, 5.5 g of succinic anhydride was dissolved in 335 ml of 1-methyl-2-pyrrolidone. 50 ml of 1M sodium borate solution (containing 3.09 g of boric acid and sodium hydroxide for pH adjustment in purified water to a total volume of 50 ml, pH: 8.0) was added to the succinic acid solution. The glass plate above was immersed in the liquid mixture for 20 minutes. After immersion, the glass plate was washed with purified water and dried. In this manner, amino groups on the glass plate surface and succinic anhydride were allowed to react with each other, introducing carboxyl groups on the glass surface. The resulting glass plate was used as the substrate for DNA immobilization. Further, DNAs having base sequences of 1 to 4 were immobilized respectively on the glass plate in a similar manner to Example 1. FIG. 7 shows the reaction scheme (in FIG. 7, 2 represents a selective binding substance (DNA), and 5, a glass plate). The glass plate was then hybridized in a similar manner to Example 1. The plate was examined in a similar manner to Example 1 under a fluorescence microscope.

Upon observation under the fluorescence microscope, light emission was observable also on the glass plate only when the probe region is 40 bases or more. However, the fluorescence intensity from the three glass plates in Comparative Examples was shown to be distinctively lower than that when the substrate is PMMA. For further quantitative discussion, the light intensity from these substrates was determined by using a scanner. The results thereof and from Example 1 are summarized in Table 1. The results in Table 1 indicate that the fluorescence is lower, the noise larger, and the S/N ratio inferior on the glass plate.

Separately, a DNA was immobilized and hybridized in the same scheme as above by using another commercially available slide glass carrying amino groups. The slide glasses used were a coated slide glass carrying high-density amino groups for DNA microarray (manufactured by Matsunami Glass Ind., Ltd., Product Number: SD00011) and a MAS-coated slide glass (manufactured by Matsunami Glass Ind., Ltd., Product Number: S081110). Analysis in a similar manner to above showed that the S/N ratio was inferior even when these slide glasses were used compared to when a PMMA plate is used as the substrate. The results are summarized in Table

TABLE 1

| | | Base length of probe | | | | | | | |
|---|---|---|---|---|---|---|---|---|---|
| | | 70 Bases | | 60 Bases | | 40 Bases | | 20 Bases | |
| | Kind of substrate | Fluorescence intensity | Noise | Fluorescence intensity | Noise | Fluorescence intensity | Noise | Fluorescence intensity | Noise |
| Example 1 | PMMA | 23000 | 150 | 18400 | 155 | 12400 | 150 | 2500 | 145 |
| Comparative Example 1 | APS glass | 3000 | 1600 | 1800 | 1540 | 1200 | 1620 | 1680 | 1330 |
| | MAS glass | 7500 | 2000 | 6700 | 2100 | 2000 | 1890 | 1530 | 1680 |
| | Glass carrying high-density amino groups | 8500 | 2300 | 7200 | 2000 | 3500 | 1800 | 1850 | 1500 |

Comparative Example 2

Preparation of Slide Glass

Amino groups were introduced on the surface of a slide glass by using 3-aminopropyltriethoxysilane in a similar manner to Comparative Example 1. Then, carboxyl groups were introduced on the surface of the slide glass in a similar manner to Comparative Example 1 by using succinic anhydride, and then the slide glass was washed with acetonitrile and dried under reduced pressure for 1 hour. After drying, the terminal carboxylated glass plate was immersed in a solution of EDC (955 mg) and N-hydroxysuccinimide (575 mg) in acetonitrile (50 ml) for 2 hours, washed with acetonitrile, and dried for 1 hour under reduced pressure, to give a glass plate having N-hydroxysuccinimide groups bound to the surface via ester bonds.

(Immobilization of DNA)

By using a 5'-terminal aminated DNA similar to that in Example 1, 200 nl of an aqueous DNA dispersion in 0.1M carbonate buffer solution (pH: 9.3, DNA concentration: 0.027 nmol/μl) was spotted on the glass plate thus obtained. Immediately then, the glass plate after immobilization was left at 25° C. and a humidity of 90%, and the glass plate was washed twice with a mixture solution of 0.1% (w/v) SDS and 2×SSC and once with an aqueous 0.2×SSC solution successively. Then, the glass plate after the washing was immersed in an aqueous 0.1M glycine solution (pH: 10) for 1 hour and 30 minutes, washed with distilled water, and dried at room temperature, to give a glass plate carrying the immobilized DNA fragment.

(Detection)

The glass plate was hybridized by using the same sample DNA in a similar manner to the hybridization test in Example 1. Results are summarized in Table 2. As apparent from the results, the substrate in Example 1 has an unsatisfactory S/N ratio, compared to the PMMA substrate.

TABLE 2

| | Base length of probe | | | | | | | |
|---|---|---|---|---|---|---|---|---|
| | 70 Bases | | 60 Bases | | 40 Bases | | 20 Bases | |
| | Fluorescence intensity | Noise | Fluorescence intensity | Noise | Fluorescence intensity | Noise | Fluorescence intensity | Noise |
| Comparative Example 2 | 4300 | 2000 | 3000 | 1500 | 1800 | 1220 | 1500 | 1200 |

Example 2

Preparation of DNA-immobilized Support

Carbon black was mixed with a PMMA having an average molecular weight of 150,000 at a ratio of 3 wt %, and the mixture was processed into a black substrate having a thickness of 1 mm by casting method. The black PMMA substrate was immersed in an aqueous 10N sodium hydroxide solution at 65° C. for 12 hours. The substrate was washed with purified water, an aqueous 0.1N HCl solution, and purified water in that order. The intensity of the self-fluorescence of the plate (without alkali treatment) was 250, as determined under the conditions of an excitation wavelength of 532 nm, a set photomultiplier gain of 700, and a laser power of 33% by using GenePix 4000B manufactured by Axon Instruments. A blackened DNA-immobilized support was prepared in a similar procedure by using four kinds of probe DNA's similar to those used in Example 1.

Separately, a similar substrate was prepared and the spectroscopic reflectance and transmissibility of the black substrate were determined, and as a result, the substrate had a spectroscopic reflectance of 5% or less at a wavelength in the entire visible light range (wavelength: 400 to 800 nm) and a transmissibility of 0.5% or less at a wavelength in the same range. The substrate had a uniformly flat spectrum without a particular spectral pattern (e.g., peaks) both in spectroscopic reflectance and transmissibility in the visible light range. The spectroscopic reflectance is a spectroscopic reflectance including regular reflectance from the support, as determined by using a device equipped with an optical illuminator-detector system (CM-2002, manufactured by Minolta Camera) compatible with the condition C of JIS Z 8722.

(Preparation and Hybridization of Sample DNA)

A sample DNA was prepared and hybridized in a similar manner to Example 1.

(Measurement)

Fluorescence was measured with a scanner under the same condition as that in Example 1. The results of scanner observation are summarized in Table 3. In a similar manner to Example 1 the fluorescence intensity increased as the base number increased. The background fluorescence intensity also declined, compared to the result in Example 1. The results confirmed that blackening of the substrate lead to decrease in noise and increase in S/N ratio.

Example 3

A slide glass carrying 3-aminopropyltriethoxysilane introduced on the surface was prepared in a similar manner to Comparative Example 1. PMMA dissolved in chloroform was spin-coated thereon, and the slide glass was left at 100° C. for 15 minutes and additionally at 115° C. for 1 hour, to give a support consisting of a support layer (glass) and a layer carrying an immobilized selective binding substance (PMMA). The thickness of the spin-coated PMMA was approximately 20 μm.

Then, the support was immersed in 10N NaOH for 10 hours, forming carboxyl groups on the PMMA surface. A probe DNA was immobilized, a sample DNA was prepared and hybridized, and the fluorescence intensity thereof was determined in a similar manner to Example 1. Results similar to those in Example 1 were obtained. Although the substrate was slightly bent in Example 1, there was no warp observable in the support of this Example.

In addition, when the PMMA used in Example 2 containing dispersed carbon black was spin-coated similarly, the fluorescence intensity and noise similar to those in Example 2 were obtained, and there was no warp observable in the support also in this case.

Example 4

A test was conducted in a similar manner to Example 1, except that 10N sulfuric acid was used instead of the aqueous 10N NaOH solution during introduction of carboxyl groups on the PMMA surface. Consequently, results similar to those in Example 1 were obtained.

Example 5

A copolymer of styrene and MMA (methyl methacrylate) was prepared. The copolymer prepared had a composition of 10 mol % MMA and 90 mol % styrene. Specifically, the copolymer was prepared by dissolving MMA and styrene at a ratio of 1:9 (molar ratio) in dehydrated toluene, adding AIBN (azobisisobutylnitrile) at a ratio of 1/1000 with respect to the total mole number of MMA and styrene, and leaving the mixture under nitrogen atmosphere at 60° C. for 1 hour, at 65° C. for 3 hours, and additionally at 90° C. for 20 hours. The copolymer thus obtained was purified by ethanol precipitation and filtration.

TABLE 3

| | | Base length of probe | | | | | | | |
|---|---|---|---|---|---|---|---|---|---|
| | | 70 Bases | | 60 Bases | | 40 Bases | | 20 Bases | |
| | Kind of Substrate | Fluorescence intensity | Noise | Fluorescence intensity | Noise | Fluorescence intensity | Noise | Fluorescence intensity | Noise |
| Example 2 | Black PMMA | 25000 | 50 | 21000 | 45 | 11800 | 66 | 1500 | 52 |

The composition of the purified polymer was examined by NMR (nuclear magnetic resonance). The molecular weight of the polymer was determined by GPC, and the number-averaged polymerization degree calculated therefrom was 1,100.

Then, the purified polymer was processed into a plate having a thickness of 1 mm by casting method. The tests similar to those in Example 1 were performed, except that the DNA of sequence No. 2 was used for immobilization. The fluorescence was determined with a scanner under the conditions similar to Example 1. The result revealed that the fluorescence intensity was 5,200, the noise, 150, and the MMA content, 10%, and that the S/N ratio was improved, compared to those in Comparative Examples 1 and 2. The self-fluorescence intensity of a non-alkali-treated flat plate was 750, as determined by using GenePix 4000B manufactured by Axon Instruments under the conditions of an excitation wavelength of 532 nm, a set photomultiplier gain of 700, and a laser power of 33%.

Comparative Example 3

A homopolymer of polystyrene was prepared and processed into a plate having a thickness of approximately 1 mm by casting method. In the tests by using the plate similar to those in Example 1, there was no fluorescence indicating hybridization between the probe DNA and the sample DNA observed at all.

Example 6

Preparation of DNA-immobilized Support

A mold for injection molding was prepared according to a known LIGA (Lithographie Galvanoformung Abformung) process, and a PMMA substrate having the shape described below was prepared by injection molding. The PMMA used in this Example had an average molecular weight of 150,000 and contained carbon black (#3050B, manufactured by Mitsubishi Chemical Corp.) at a ratio of 1 wt %, and the substrate was black in appearance. When the spectroscopic reflectance and transmissibility of the black substrate were determined, the spectroscopic reflectance was 5% or less at a wavelength in the visible light range (wavelength: 400 to 800 nm) and the transmissibility was 0.5% or less at a wavelength in the same range. The spectra of both the spectroscopic reflectance and transmissibility were uniformly flat, without particular spectral patterns (e.g., peaks). The spectroscopic reflectance is a spectroscopic reflectance including regular reflection from the support, as determined by using a device equipped with an optical illuminator-detector system (manufactured by Minolta Camera, CM-2002) compatible with the condition C of JIS Z 8722.

The shape of the substrate was 76 mm in length, 26 mm in width, and 1 mm in thickness, and the surface was flat except in the central area of the substrate. A concave part of 10 mm in diameter and 0.2 mm in depth 0.2 mm is formed on the center of the substrate, and 64 (8×8) projections having a top face diameter of 0.2 mm and a height of 0.2 mm were formed in the concave part. The projections, which have a basal diameter (diameter of the base region of the projection) of 0.23 mm, are tapered, for convenience in releasing the substrate after injection molding. The difference between the height of projection top face (average of the heights of 64 projections) in the concavo-convex part and the height of the flat area was 3 μm or less, when determined. In addition, the variation in height of the 64 projection top faces (difference in height between the highest and the lowest projection top faces), and the difference between the height of projection top face in the irregularly surfaced area and the height of the flat area, when determined, were both 3 μm or less. Further, the pitch of the projections in the irregularly surfaced area (distance between a projection center to another projection center next to it) was 0.6 mm.

The PMMA substrate was immersed in an aqueous 10N sodium hydroxide solution at 65° C. for 12 hours. The substrate was washed with purified water, an aqueous 0.1N HCl solution, and purified water in that order, to give a substrate having carboxyl groups formed on the surface. The self fluorescence intensity of the plate, i.e., the PMMA flat plate containing carbon black used in this Example, was 250, as determined under the conditions of an excitation wavelength of 532 nm, a set photomultiplier gain of 700, and a laser power of 33% by using GenePix 4000B manufactured by Axon Instruments.

(Immobilization of Probe DNA)

The DNA of sequence No. 2 (60 bases, 5'-terminal aminated) was prepared. The DNA was aminated at the 5'-terminal. The DNA was dissolved in purified water at a concentration of 0.27 nmol/μl, which was used as a stock solution. For spotting the substrate, the stock solution was diluted with PBS (pH: 5.5) to a final probe concentration of 0.027 nmol/μl, and 1-ethyl-3-(3-dimethylaminopropyl)carbodiimide (EDC) was added thereto to a final concentration of 50 mg/ml for facilitating condensation between the carboxyl groups on the support surface and the terminal amino group of the probe DNA. The mixture solution, i.e., probe DNA, was the spotted at four points on the projections of the PMMA substrate with a glass capillary under a microscope. Then, the substrate was placed in a tightly sealed plastic container and incubated under the condition of 37° C. and a humidity of 100% for approximately 20 hours, and then, washed with purified water.

Preparation of Sample DNA

The sample DNA was prepared in a similar manner to Example 1.

(Hybridization)

To 10 μL of the DNA solution described above (preparation of sample DNA), added was 30 μl of a solution containing 1% (w/v) BSA, 5×SSC, 0.1% (w/v) SDS, and 0.01% (w/v) salmon sperm DNA, to make the total solution 40 μl (that is, the sample concentration was ¼ compared to that in Examples 1 or 2, but the total sample quantity is the same as that in Example 1.). The solution was applied dropwise onto the irregularly surfaced area of the DNA-immobilized support described above, and the substrate was covered carefully with a cover glass. Then, the area surrounding the cover glass was sealed with a paper bond, for prevention of vaporization of the hybridization solution. Namely, the molecular weight of the sample DNA was made the same as those in Example 1 and Comparative Example 1. The substrate was placed in a plastic container and incubated under the condition of a humidity of 100% and a temperature of 65° C. for 10 hours. After incubation, the cover glass was removed, and the substrate was washed and dried.

(Measurement)

The fluorescence therefrom was analyzed in a similar manner to Example 1 with a scanner. The results are summarized in Table 4.

TABLE 4

|  | Kind of Substrate | Spot 1 | | Spot 2 | | Spot 3 | | Spot 4 | |
|---|---|---|---|---|---|---|---|---|---|
|  |  | Fluorescence intensity | Noise | Fluorescence intensity | Noise | Fluorescence intensity | Noise | Fluorescence intensity | Noise |
| Example 6 | Black concavo-convex surfaced PMMA | 21500 | 27 | 20500 | 26 | 20200 | 28 | 20800 | 22 |

As apparent from the results, the fluorescence intensity was almost the same as that in Example 2, but the noise was further reduced from that in Example 2.

Example 7

Subsequently, a test was performed by using a substrate having projections irregular in height. The projections on the injection-molded PMMA substrate used in Example 6 were polished with a polishing paper, to make variation in the height of the projection top faces. Specifically, a support (support A) having four projections lower by 30 μm than other projections (standard projection) and a support (support B) having four projections lower by 50 μm than other projections were prepared. The difference in height between the face of the projections other than the lower projections (standard projection) and the face of the flat area was 3 μm or less. A probe DNA for spotting was prepared in a similar manner to Example 6. Then, the probe DNA solution was spotted on the faces of four standard projection and four lower projections in a similar manner to Example 6. Further, a hybridization DNA was prepared and hybridized in a similar manner to Example 6, and the hybridized support was analyzed in a similar manner to Example 6. Averages of the fluorescence intensities from the faces of standard projections and of the noise from the area surrounding them, and the average fluorescence intensity from the faces of the lower projections and the average noise from the surrounding area are summarized in Table 5.

TABLE 5

|  |  | Result of standard projections | | Result of lower projections | |
|---|---|---|---|---|---|
|  | Kind of Support | Fluorescence Intensity | Noise | Fluorescence Intensity | Noise |
| Example 7 | Support A | 21000 | 30 | 18500 | 26 |
|  | Support B | 20800 | 25 | 16800 | 29 |

The results show that a significantly larger S/N ratio can be obtained compared to that in Comparative Examples even on a substrate where there is some fluctuation in the height of projections (50 μm or less).

Example 8

In addition, a support having a difference in height between the projection top face and the flat area was also examined. The projections on the injection-molded PMMA substrate used in Example 6 were polished with a polishing paper, to make two supports respectively having differences in height by 30 μm (support C) and 50 μm (support D) between the faces of the flat area and the projection top face. Namely, the support C has projections higher by 30 μm than the flat area. A probe DNA for spotting was prepared and spotted onto the face of the projections; a DNA for hybridization was prepared and hybridized in a similar manner to Example 6; and the support was analyzed in a similar manner to Example 6. The number of the projections in the substrate on which the DNA solution was spotted was four. Averages of the fluorescence intensities of the DNA-bound spots (four spots) and the noises in the areas surrounding them (4 areas) were determined. The results are summarized in Table 6.

TABLE 6

|  | Base material C | | Base material D | |
|---|---|---|---|---|
|  | Fluorescence intensity | Noise | Fluorescence intensity | Noise |
| Example 8 | 19100 | 32 | 16500 | 30 |

The results show that a significantly larger S/N ratio can be obtained compared to Comparative Examples even where there is some difference in height between the flat area top face and the projection top face (50 μm or less).

Example 9

Flat plates of polymethyl methacrylate, polyethyl methacrylate, and polyphenyl methacrylate were prepared by casting and immersed in an aqueous 10N sodium hydroxide solution at 50° C. for 10 hours. The flat plates were washed with purified water, an aqueous 0.1N HCl solution, and purified water in that order. In this way, carboxyl groups were formed on the surface of the plates by hydrolysis of the polymer side-chains.

A probe DNA was immobilized (the immobilized probe DNA had only 60 bases); a sample DNA was prepared and hybridized; and the resulting plate was analyzed in a similar manner to Example 1. The results are summarized in Table 7.

TABLE 7

|  | Kind of support | Fluorescence intensity | Noise |
|---|---|---|---|
| Example 9 | Polymethyl methacrylate | 13100 | 175 |
|  | Polyethyl methacrylate | 12000 | 190 |

TABLE 7-continued

| Kind of support | Fluorescence intensity | Noise |
|---|---|---|
| Polyphenyl methacrylate | 15000 | 350 |

These results show that the flat plates show significantly large S/N ratios, compared to Comparative Examples.

Example 10

Preparation of DNA-immobilized Support

A substrate similar to that in Example 6 was prepared. Then, a Ni—Cr film (Ni/Cr composition is $Ni_8Cr_2$) having a thickness of 50 nm was formed on the substrate by sputtering. Separately, a solution of 1 g of pulverized granules of the substrate (without a Ni—Cr film) dissolved in 10 mL of chloroform was prepared. Then, an insulation layer of black PMMA film was formed on the Ni—Cr film by coating the solution thereon by spin coating. After removal of the insulation layer and the Ni—Cr film on the projection top face with a polisher, the substrate was immersed in 10N NaOH solution at 65° C. and then washed with purified water, an aqueous 0.1N HCl solution, and purified water in that order. A probe DNA was then immobilized, and a sample DNA was prepared in a similar manner to Example 6.
(Hybridization)

Chromium and gold films were deposited on a cover glass respectively to a thickness of 5 nm and 100 nm. A gold wire was connected thereto by soldering. Separately, 50 µl of the solution for hybridization was added onto the irregularly surfaced area of support where the nucleic acid previously prepared is immobilized, and the cover glass above was laid on the irregularly surfaced area with its golf face facing the support. At the time, a spacer of 0.2 mm in thickness was placed between the support and the gold cover glass for prevention of short circuiting. The area surrounding the cover glass was sealed with a paper bond for prevention of vaporization of the hybridization solution.

Then, the Ni—Cr film on support and the anode of power source were connected to each other and the gold (gold wire) of cover glass to the cathode of the power source by using a gold wire and a commercially available silver paste for electrical connection. The support was placed in an oven and incubated therein at 65° C. for 15 minutes. After application of a voltage of 1 V from the power source for 5 minutes, the support was removed from the oven and, after removal of the cover glass, washed and dried.

Consequently, results similar to those in Example 6 were obtained. In this manner, even if the hybridization period is shorter, it is possible to shorten the hybridization period by forming an electrode to the side face of the projection and applying an electric field.

Comparative Example 4

A plate of 1 mm in thickness having polyacrylonitrile as the main component (Zexlon, manufactured by Mitsui. Chemicals, Inc.) was cut into pieces of 75 mm×25 mm in size. These pieces were immersed and left in 10N NaOH at 70° C. for 12 hours. After washing, a probe DNA was immobilized (probe DNA length: 60 bases), and the immobilized plate was hybridized with a sample DNA in a similar manner to Example 1. The plate was evaluated in a similar manner to Example 1, but it was not possible to determine whether the sample and the probe were hybridized because of greater autofluorescence. It is because the plate is yellowish as it is and extremely higher in autofluorescence. When measured under the conditions of an excitation wavelength of 532 nm, a set photomultiplier gain of 700, and laser power of 33% by using GenePix 4000B manufactured by Axon Instruments, the self-fluorescence intensity of the flat plate before alkali treatment was extremely large at 30,000.

Comparative Example 5

99 Parts by weight of methyl methacrylate (MMA) and 1 part by weight of methacrylic acid were copolymerized. After purification, the copolymer was dissolved in a solvent, and a film of this polymer was formed on a PMMA plate by dipping. A probe DNA (60 base length) was immobilized on the film; a sample DNA was hybridized in a similar manner to Example 1, except that the alkali immersion was eliminated; and the resulting support was analyzed in a similar manner to Example 1. As a result, the signal intensity was 6000, and the noise intensity was 300.

Example 11

99 Parts by weight of methyl methacrylate (MMA) and 1 part by weight of methacrylic acid were copolymerized. After purification, the copolymer was dissolved in a solvent, and a film of this polymer was formed on a PMMA plate by dipping. A probe DNA (60 base length) was immobilized on the film; a sample DNA was hybridized in a similar manner to Example 1, except that the support was immersed in the alkali solution at 50° C. for 10 hours; and the resulting support was analyzed in a similar manner to Example 1. As a result, the signal intensity was 15,000, and the noise intensity was 150. The reason for that the results in this Example were superior to those in Comparative Example 5 seems to be the presence of an alkali treatment that increases the amount of carboxyl groups on the support surface. A plate of 1 mm in thickness of a copolymer prepared from 99 parts by weight of methyl methacrylate (MMA) and 1 part by weight of methacrylic acid was prepared by casting; and when measured under the conditions of an excitation wavelength of 532 nm, a set photomultiplier gain of 700, and a laser power of 33% by using GenePix 4000B manufactured by Axon Instruments, the self fluorescence intensity of the non-alkali-treated flat plate was 850.

Comparative Example 6

The same test was repeated, except that the alkali treatment (immersion in a sodium hydroxide solution) in Example 1 was eliminated. As a result, there was no observed fluorescence indicating hybridization. It is seemingly because absence of alkali or acid surface treatment results in formation of carboxyl groups in an insufficient amount, consequently leading to decrease in the amount of a probe DNA immobilized.

INDUSTRIAL APPLICABILITY

We provide a support carrying an immobilized selective binding substance that is smaller in adsorption of nonspecific samples, favorable in hybridization efficiency, and consequently favorable in S/N ratio.

What is claimed is:

1. A support carrying an immobilized selective binding substance comprising: a concavo-convex part containing multiple projections and a flat area surrounding the concavo-convex part, wherein the selective binding substance immobilized is on a surface of top faces of the multiple projections, a difference in height between the top faces of highest and lowest projections of the multiple projections is 50 µm or less, and the top faces of the multiple projections are substantially flat, and wherein the flat area is free of concavo-convex structures and higher in height than top faces of the multiple projections, in which the difference in height between the top faces of the highest projections of the multiple projections and the top face of the flat area is 100 µm or less, the support has a surface with polymer comprising a low-autofluorescence resin, the support surface of the resin having carboxyl groups and a selective binding substance essentially immobilized only on the surface of the top faces of the multiple projections of the concavo-convex portion through the carboxyl groups.

2. The support according to claim 1, in which the low-autofluorescence resin has a fluorescence intensity of 1,000 or less.

3. The support according to claim 1, in which the low-autofluorescence resin is a homopolymer selected from the group of polyalkyl methacrylate, polyvinyl acetate, polycyclohexyl methacrylate and polyphenyl methacrylate, or a copolymer comprising polymer components thereof.

4. The support according to claim 1, in which the low-autofluorescence resin is polyalkyl methacrylate or a copolymer comprising alkyl methacrylate in amount of 10% or more with respect to the total monomer units.

5. The support according to claim 1, in which the low-autofluorescence resin is polymethyl methacrylate.

6. The support according to claim 1, in which the immobilized selective binding substance is immobilized on the top faces of the multiple projections through the carboxyl groups with a condensation agent.

7. The support according to claim 1, in which the selective binding substance is immobilized by a covalent bond between an amino or hydroxyl group of the selective binding substance and a carboxyl group on the support surface.

8. The support according to claim 1, in which the selective binding substance is a nucleic acid.

9. The support according to claim 1, in which the support surface is black in color.

10. The support according to claim 1, in which the low-autofluorescence resin contains carbon black.

11. The support according to claim 1, in which the support layer is glass or a metal.

12. The support according to claim 1, in which the difference in height between the face of the projections in the concavo-convex part and the face of the flat area is 50 μm or less.

* * * * *